United States Patent
Cardot (10) Patent No.: US 12,190,387 B1
(45) Date of Patent: *Jan. 7, 2025

(54) CYBERSAFETY INCREMENTAL INSURANCE POLICY UTILIZING BLOCKCHAIN UNDERWRITING PROCESS

(71) Applicant: CloudCover IP, LLC, Burnsville, MN (US)

(72) Inventor: Stephen Cardot, Burnsville, MN (US)

(73) Assignee: CloudCover IP, LLC, Burnsville, MN (US)

( * ) Notice: Subject to any disclaimer, the term of this patent is extended or adjusted under 35 U.S.C. 154(b) by 369 days.

This patent is subject to a terminal disclaimer.

(21) Appl. No.: 17/573,502

(22) Filed: Jan. 11, 2022

Related U.S. Application Data (63) Continuation-in-part of application No. 16/925,036, filed on Jul. 9, 2020, now Pat. No. 11,223,647.

(60) Provisional application No. 62/874,142, filed on Jul. 15, 2019.

(51) Int. Cl.
G06F 21/00 (2013.01)
G06Q 40/08 (2012.01)

(52) U.S. Cl.
CPC .................. *G06Q 40/08* (2013.01)

(58) Field of Classification Search
CPC ...................................................... G06Q 40/08
See application file for complete search history.

(56) References Cited

U.S. PATENT DOCUMENTS

| | | | | |
|---|---|---|---|---|
| 10,872,381 | B1 * | 12/2020 | Leise | G06F 16/183 |
| 10,891,694 | B1 * | 1/2021 | Leise | H04L 9/0825 |
| 2011/0131065 | A1 * | 6/2011 | Butcher, III | G06Q 40/08 705/4 |
| 2015/0286684 | A1 * | 10/2015 | Heinz | G06F 16/24568 707/769 |
| 2017/0206603 | A1 * | 7/2017 | Al-Masoud | G06Q 40/06 |
| 2018/0034685 | A1 * | 2/2018 | Naous | H04L 41/22 |
| 2018/0183901 | A1 * | 6/2018 | Lariviere | G06Q 40/02 |
| 2018/0220189 | A1 * | 8/2018 | Hodge | G06F 16/7837 |
| 2019/0215149 | A1 * | 7/2019 | Ramasamy | H04L 67/1012 |
| 2019/0303939 | A1 * | 10/2019 | Kurian | G06Q 20/3224 |
| 2019/0392354 | A1 * | 12/2019 | Yang | G06N 5/04 |
| 2020/0065761 | A1 * | 2/2020 | Tatchell | G06Q 20/3825 |
| 2021/0326992 | A1 * | 10/2021 | Leise | H04L 9/3271 |

* cited by examiner

Primary Examiner — Mahfuzur Rahman
(74) Attorney, Agent, or Firm — Spencer Fane, LLP (57) ABSTRACT

A cybersafety incremental insurance policy utilizing blockchain underwriting process. A cyber risk event relating to transfer of data to a first party is identified using a first smart contract module. Cyber risk control of the cyber risk event is enabled using a second smart contract module. Cyber risk associated with the cyber risk control is transferred using a third smart contract module. The first smart contract, the second smart contract and the third smart contract are integrated into a multi-tier decentralized interaction that is recorded in a blockchain token utilizing a decentralized append only distributed ledger and a consensus algorithm for agreement to change requests on the distributed ledger. A premium associated cyber risk transfer is paid. Once the first party confirms receipt of the data, proof of premium is released into an insuring entities account.

14 Claims, 3 Drawing Sheets

CYBERSAFETY INCREMENTAL INSURANCE POLICY UTILIZING BLOCKCHAIN UNDERWRITING PROCESS

REFERENCE TO RELATED APPLICATION

This application is a continuation-in-part of U.S. application Ser. No. 16/925,036, filed Jul. 9, 2020, and claims priority to U.S. Applic. No. 62/874,142, which was filed on Jul. 15, 2019. The contents of which are incorporated herein by reference.

FIELD OF THE INVENTION

The invention relates generally to cybersafety. More particularly, the invention relates to cybersafety incremental insurance policy utilizing blockchain underwriting process.

BACKGROUND OF THE INVENTION

Understanding how blockchain works and identifying myths about its powers are the first steps to developing blockchain technologies. Blockchain is an algorithm and distributed data structure for managing digital (smart) contracts without a central administrator among people who know nothing about one another.

Originally designed for the crypto-currency application, the blockchain architecture was driven by a radical rejection of government-guaranteed money and bank-controlled payments. Today, blockchain is a special instance of a distributed ledger technology, whereby almost all current blockchains have emerged within the smart contract wake.

Basically, blockchain monitors and verifies digital transactions by calling upon a decentralized network of volunteer-run nodes to, in effect, vote on the order in which transactions occur. The network's algorithm ensures that each transaction is unique. It is this act of linking blocks into a chain that makes the information stored on a blockchain so trustworthy.

Once the data is recorded in a block, it cannot be altered without changing every block that came after it, making it impossible to do so without it being seen by all blockchain participants.

Blockchain eliminates old, slow accounting systems and workload management systems. Instead, the data transactions and validation are done in real-time. This process opens up a whole new host of applications that can be based around real-time cybersafety. Blockchain's decentralized distributed ledger-enabled technology opens the world of possibilities for solving risk exposed IT event problems that have plagued us for years.

Blockchain allows instantaneous single source of truth and establishes distributed consensus between mutually distrustful [data] parties. Blockchains enlist the most important elements that make up the data management system to account for an online business for data's entire IT event lifecycle.

The record of an event is cryptographically secured with a digital signature, that is verified, ordered, and bundled together into blocks, from transactions in a blockchain. Furthermore, a smart 'insurance policy' contract within the blockchain of this invention allows automatic execution of IT event risk transactions upon meeting predefined criteria.

In 1996, Nick Szabo coined the term 'smart contract'. Smart contracts are simply computer coded programs that execute predefined actions when certain conditions within the risk aware system are known. They can facilitate the exchange and transfer anything of value.

Cryptography is the technique used to allow secure communication between different parties and to ensure the authenticity and immutability of the data being communicated. For blockchain technologies, cryptography is used to prove that a transaction was created by the right person and provides the immutability of the transactions recorded on blockchains. It is also used to link transactions into a block in a tamper-proof way and create the links between blocks forming the blockchain.

SUMMARY OF THE INVENTION

An embodiment of this invention is directed to a fully decentralized cybersafety risk platform developed to establish on-demand data insurance by embedding micro-insurance policy agreements into digital transactions, secured and ledgered within blockchain technology. Utilizing an innovative patent technology that provides a trustworthy ecosystem for incremental risk quantification, risk qualification and underwriting digital assets, this invention intends to remove the conventional barriers to real time data insurance.

The platform according to an embodiment of this invention offers the beneficiary (insured user) the ability to not only transfer risk of their data's security on-demand, but unlock the data value at risk, by participating in the premium's risk income attributed to the underwriting of the smart contract's micro-service (policy) which will occur daily within the $1.2 trillion annual insurance premium ecosystem.

The risk protocol according to an embodiment of this invention is powered by blockchain technology that simplifies the user experience, promoting rapid adoption of the platform. The blockchain will be the catalyst to transforming the cyber insurance industry, since this invention is more accessible, granular, and more accurate with greater speed.

By empowering digital risk holders to freely transact data insurance without the limitations of intermediaries, this invention will help tackle the global issue of data privacy and security. The fully decentralized services will provide unrestricted access to insurance risk products that often do not exist (or are not affordable) within existing insurance establishments, due to gatekeepers in the insurance markets.

Some of the key issues inherent with legacy services include confusion due to varying coverage, excessive premium rates and broker fees, strict credit requirements and reinsurance capital market manipulation. In addition, the conventional insurance process often takes days or even weeks for approval and requires significant upfront paperwork. Thus, this invention capitalizes on a massive opportunity to disrupt the existing market by providing an innovative data insurance solution, on-demand, micro-service based that is easy to use and only seconds to apply.

The current market capitalization for cryptocurrencies is approximately $400 billion globally and there is significant projected growth in the next few years. Additionally, it is anticipated there will be a gradual shift towards the tokenization of insurance products and traditional assets (i.e. securities, commodities, real estate) which will further accelerate the growth of insured digital assets worldwide.

As an early adopter phase of the digital asset insurance economy, an initial target market may consist of individuals actively using or investing in cyber security as well as cryptocurrency.

A key competitive advantage of this invention is a risk compliant cross-chain platform that allows integration into different blockchains through smart contract technology. This is very important because it provides us the ability to offer a more diverse, agnostic range of digital insurance and assets for risk transfer as opposed to Ethereum.

Another competitive advantage of this platform is a reward mechanism for users called PORT. This feature may incentivize users to participate more in these services as they will be rewarded in the native tokens (in addition to premium income earned from insured cover) based on number/size of transactions completed on the platform.

The architecture of this invention represents a multi-tier decentralized interaction utilizing three smart contract applications known as C3C. C3C smart contracts are simply computer coded programs that execute predefined actions when certain conditions are met. The C3C may utilize risk tracking software (i.e., tokens) to identify, track and manage micro-services to: 1) identify cyber risk events; 2) enable cyber risk control; 3) transfer cyber risk via C3C's smart policy. In certain embodiments, all front-office and back-office administrative functionality may be automated.

The C3C solution solves the financial-technology setback of tracking IT risk events on an incremental basis that has plagued the insurance industry since the inception of the Internet. The platform may incorporate securitization functionality of the C3C token to permit participants (customers) to interact directly with blockchain tokenized digital asset exchanges to permit C3C token liquidity.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

NOMENCLATURE

The following nomenclature is used in this patent application:
AML—anti-money laundering
ATS—alternative trading system
B2B—business to business
B2C—business to consumer
C2C—consumer to consumer
C3C—three smart contract applications
CCL—C3C CloudLedger
CS—cybersafety
CSC—C3C smart contract
CSR—common reporting standard
CTP—C3C token platform
CTS—C3C transaction system
GRC—governance-risk-compliance
IP—internet protocol
IT—information technology
KYC—know your customer
PORT—permission of risk transfer
PORT—proof of risk/transfer/time
POS—proof of stake
SDN—software-defined network
STO—security token offering
UI—user interface
UID—unique identifier
UX—user experience

DETAILED DESCRIPTION OF THE INVENTION

The token platform of this invention is massively scalable, secure, private-public, insurance-industry friendly that assists in the underwriting of cryptocurrency transactions. In the blockchain of this invention, transactions involve the transfer of quantifiable risk, while in other blockchains, transactions may involve the transfer of any asset or a record of some service being rendered. The smart contract that includes the blockchain of this invention provides the policy language of the transaction that allows the ledger state to be modified.

Consensus in the network refers to the process of achieving agreement among the network participants as to the correct state of data on the system. Consensus leads to all nodes sharing the exact same data. A consensus algorithm, hence, does two things: (1) it ensures that the data on the ledger is the same for all the nodes in the network, and, in turn, (2) prevents malicious actors from manipulating the data. The consensus algorithm varies with different Hyperledger (blockchain) applications.

Figure 1:
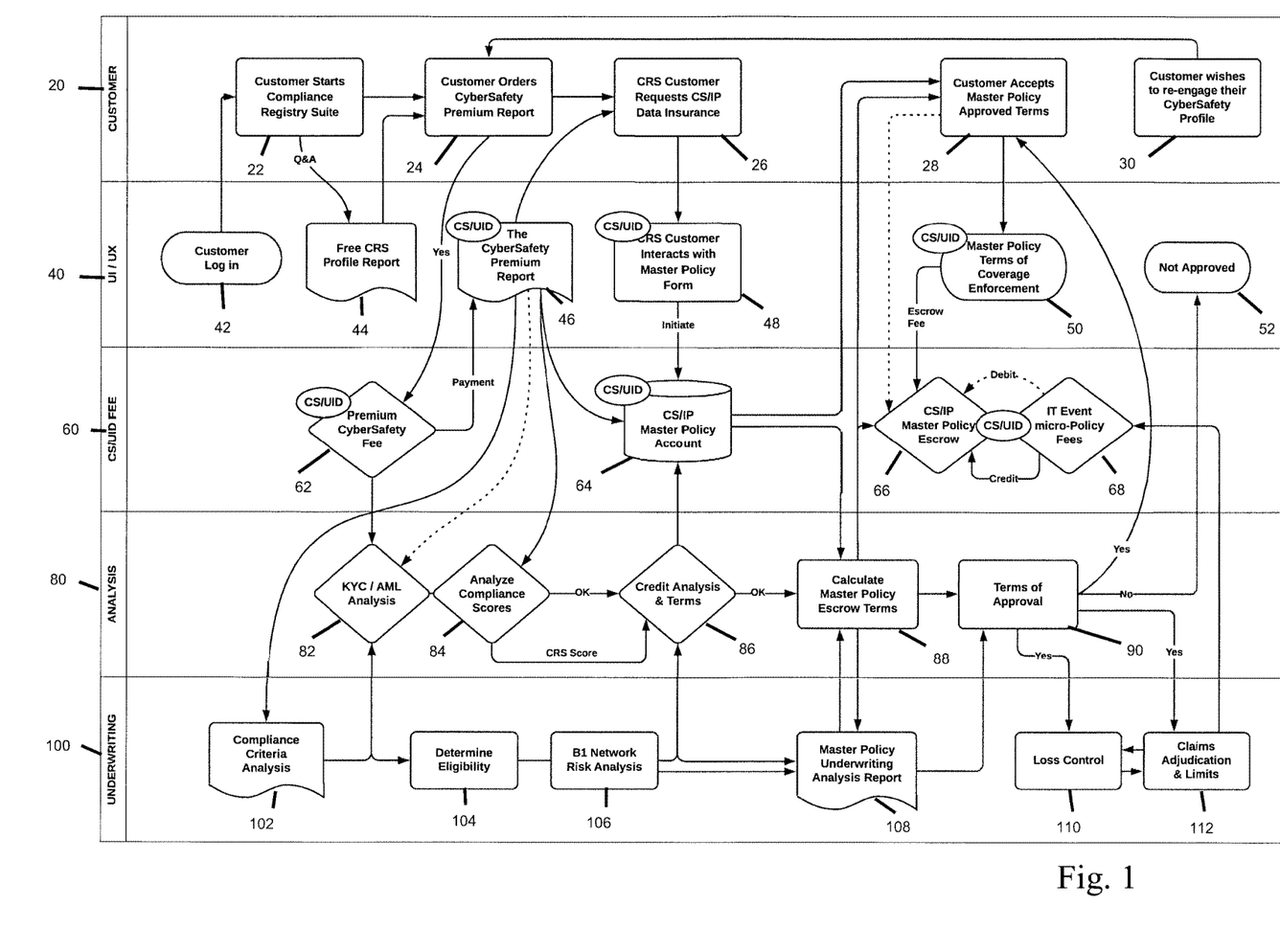
FIG. 1 is a cybersafety incremental insurance policy utilizing blockchain underwriting process.

The first row 20 in the table relates to the customer. The customer starts compliance registry suite module 22 in the customer row 20 receives input data from the customer log in module 42. The initial application is started when the customer starts compliance registry suite module 22 sends output data to the customer orders cybersafety premium report module 24. The customer starts compliance registry suite module 22 also sends question and answer data to the free CRS profile report module 44.

The customer orders cybersafety premium report module 24 in the customer row 20 receives input data from the customer starts compliance registry suite module 20, the free CRS profile report module 44 and the customer wishes to re-engage their cybersafety profile module 30. The customer orders cybersafety premium report module 24 sends output data to the CRS customer requests CS/IP data insurance module 26 and output yes data to the premium cybersafety fee module 62.

The CRS customer requests CS/IP data insurance module 26 in the customer row 20 receives input data from the customer orders cybersafety premium report module 24 and the cybersafety premium report module 46. The CRS customer requests CS/IP data insurance module 26 sends output data to the CRS customer interacts with master policy form module 48.

The customer accepts master policy approved terms module 28 in the customer row 20 receives input data from the CS/IP master policy account module 64 and the calculate master policy escrow terms module 88. The customer accepts master policy approved terms module 28 also receives yes input data from the terms of approval module 90.

The customer accepts master policy approved terms module 28 sends output data to the master policy terms of coverage enforcement module 50 and the CS/IP master policy escrow module 66.

The customer wishes to re-engage their cybersafety profile module 30 in the customer row 20 sends output data to the customer order cybersafety premium report module 24.

The second row 40 in the table relates to UI/UX. The customer log in module 42 in the UI/UX row 40 sends output data to the customer starts compliance registry suite module 22. The free CRS profile report module 44 in the UI/UX row 40 receives question and answer data from the customer starts compliance registry suite module 22. The free CRS profile report module 44 sends data to the customer orders cybersafety premium report module 24.

The cybersafety premium report module 46 in the UI/UX row 40 receives payment data from the premium cybersafety fee module 62. The cybersafety premium report module 46 sends output data to the CRS customer reports CS/IP data insurance module 26, the CS/IP master policy account module 64, the KYC/AML analysis module 82, the analyze compliance scores module 84 and the compliance criteria analysis module 102.

The CRS customer interacts with master policy form module 48 in the UI/UX row 40 receives input data from the CRS customer requests CS/IP data insurance module 26 and sends initiate output data to the CS/IP master policy account module 64.

The master policy terms of coverage enforcement module 50 in the UI/UX row 40 receives input data from the customer accepts master policy approved terms module 28. The master policy terms of coverage enforcement module 50 sends output escrow fee data to the CS/IP master policy escrow module 66.

The not approved module 52 in the UI/UX row 40 receives no data from the terms of approval module 90.

The third row 60 in the table relates to CS/UID fee. The premium cybersafety fee module 62 in the CS/UID fee row 60 receives yes input data from the customer orders cybersafety premium report module 24. The premium cybersafety fee module 62 sends payment data to the cybersafety premium report module 46. The premium cybersafety fee module 62 also sends data to the KYC/AML analysis module 82.

The CS/IP master policy account module 64 in the CS/UID fee row 60 receives input data from the cybersafety premium report module 46, the CRS customer interacts with master policy form module 48 and the credit analysis and terms module 86. The CS/IP master policy account module 64 sends output data to the customer accepts master policy approved terms module 28 and the calculate master policy escrow terms module 88.

The CS/IP master policy escrow module 66 in the CS/UID fee row 60 receives input data from the customer accepts master policy approved terms module 28 and the master policy terms of coverage enforcement module 50. The CS/IP master policy escrow module 66 sends data to and receives data from the IT event micro-policy fees module 68 in the CS/UID fee row 60. For example, the IT event micro-policy fees module 68 sends debit data and credit data to the CS/IP master policy escrow module 66. The IT event micro-policy fees module 68 also receives data from the claims adjudication and limits module 112.

The fourth row 80 in the table relates to analysis. The KYC/AML analysis module 82 in the analysis row 80 receives output data from the premium cybersafety fee module 62 and the compliance criteria analysis module 102 in the underwriting row 100. The KYC/AML analysis module 82 also receives output data from the cybersafety premium report module 46. Output data from the KYC/AML analysis module 82 is sent to the analyze compliance scores module 84.

The analyze compliance scores module 84 in the analysis row 80 also receives input data from the cybersafety premium report module 46. The analyze compliance scores module 84 sends approval output data to the credit analysis and terms module 86. The analyze compliance scores module 84 also sends CRS score data to the credit analysis and terms module 86.

The credit analysis and terms module 86 in the analysis row 80 also receives output data from the network risk analysis module 106. Output data from the credit analysis and terms module 86 is sent to the CS/IP master policy account module 64. Output data from the credit analysis and terms module 86 is also sent to the calculate master policy escrow terms module 88.

The calculate master policy escrow terms module 88 in the analysis row 80 receives output data from the CS/IP master policy account module 64 and ok output data from the credit analysis and terms module 86. The calculate master policy escrow terms module 88 sends output data to and receives input data from the master policy underwriting analysis report 108.

The calculate master policy escrow terms module 88 sends output data to the customer accepts master policy approved terms module 28 and to the CS/IP master policy escrow module 66. The calculate master policy escrow terms module 88 also sends output data to the terms of approval module 90 in the analysis row 80.

The terms of approval module 90 in the analysis row 80 receives input data from the calculate master policy escrow terms module 88 and the master policy underwriting analysis report 108.

The terms of approval module 90 sends yes output data to the customer accepts master policy approved terms module 28, the loss control module 110 and the claim adjudication and limits module 112. The terms of approval module 90 sends no output data to the not approved module 52.

The fifth row 100 in the table relates to underwriting. The compliance criteria analysis module 102 in the underwriting row 100 receives input data from the cybersafety premium report module 46. Output data from the compliance criteria analysis module 102 is sent to the KYC/AML analysis module 82 and the determine eligibility module 104.

Output data from the determine eligibility module 104 in the underwriting row 100 is sent to the network risk analysis module 106 in the underwriting row 100. Output data from the network risk analysis module 106 in the underwriting row 100 is sent to the master policy underwriting analysis module 108 and to the credit analysis and terms module 86.

The master policy underwriting analysis report module 108 sends output data to and receives input data from the calculate master policy escrow terms module 88. The master policy underwriting analysis report module 108 also sends output data to the terms of approval module 90.

The loss control module 110 in the underwriting row 100 receives yes output data from the terms of approval module 90. The loss control module 110 sends output data to and receives input data from the claims adjudication and limits module 112.

The claims adjudication and limits module 112 in the underwriting row 110 also receives yes output data from the terms of approval module 90. The claims adjudication and limits module 112 also sends output data to the IT event micro-policy fees module 68.

Within the context of data and governance, regulation and compliance, blockchain can be used to drastically improve security and decrease dependency on central entities. Since the digitization of business processes nearly two decades ago, most enterprises have come to rely on remote databases and the interconnected devices to properly function on a daily basis.

By introducing blockchain data insurance, governance, regulations and compliance monitoring, companies can benefit from reliable databases on decentralized, encrypted and non-editable ledgers, embracing the full potential of the technology to streamline and secure their data storage. The consensus required for modification of the blockchain code as well as the ledger's distribution only serve to add to the safety and inviolability of the data stored on it. Integrating blockchain technology for example for cloud computing services will help enterprises maintain their competitive advantage by protecting valuable business intelligence, while encrypted nature of the blockchain can be used to protect networks of interconnected devices from external interference.

Understanding the hurdles to adopting governance within cloud-based services is also another challenge facing companies. At the top of the list is the resistance from internal IT teams to embrace this new way of working. Despite the clear business drivers for change (flexibility, agility, resilience, automation, cost effectiveness) and clear demand from senior business stakeholders, IT teams are still resistant to cloud services. The passing of responsibilities over to a third-party (service) is perceived as insecure because data would be leaving the building that leads to more complex governance issues.

There are two key regulatory roles. The first is the protection of personnel private information. The second is the role that government (regulation) plays is the legal enforcement of contractual obligations. We need to expand upon the second role in the deployment of smart contracts. When parties agree to a contract they are incentivized to stick to the contract because of the potential legal implications of reneging. Without the threat of legal repercussions, there would likely be a high percentage of unfulfilled contractual obligations. Such a situation would affect commerce as well as civic relationships.

However, blockchain provides digital self-enforcing cyber insurance contracts widely known as smart contracts. The stipulations in a smart contract are hard-coded into its software meaning the smart contract only executes once all policy requirements are met.

The unique self-regulatory functionality features of the C3C will allow cross cybersecurity and/or cybersafety industry barriers to be successfully implemented into any insurance market.

Features of this process include:
Low commission fees for conversion of C3C token into fiat currency and vice versa;
Lower risks of financial volatility;
In case of arbitration process, the refunds and the set penalties may be reimbursed at the same value as at the start of the arbitration process, avoiding devaluation of C3C tokens in question.
Underwriting value of the secure risk transfer feature of the transaction, may also be regulated by the C3C token value.

These unique features of the C3C token will allow the token to cross cybersecurity and/or the cyber-safety industry barrier and be successfully implemented in any other insurance market. According to Christine Lagarde, the Managing Director of the International Monetary Fund "a cryptocurrency that has self-regulatory feature can provide conventional government-issued tenders a "run for their money". In addition, C3C transaction system may fully support C3C token-based loyalty and partner programs available to all participants of CTS financial ecosystem.

CTP will solve issues with transaction fees, private keys, alphanumeric addresses, arbitration, and cyber security issues that impede mainstream users from holding a cryptocurrency. This invention makes the on-boarding process fast and hassle-free; users will not require experience with cryptocurrencies to use CTS or utilize C3C tokens.

Calculation of a cybersafety score begins with the value of between about 0.00 and 1.00 that is a measure of an organization's regulatory compliance environment based on its demography, class-of-trade profile, size of operations and business compliance requirements. Companies that develop, manufacture, market, and sell services and products anywhere in the world, must develop internal risk controls and procedures that promote adherence to applicable statutes, and regulations of data privacy and security programs in evaluating and, refining existing compliance programs to ensure regulatory compliance.

Additionally, the cybersafety score serves as the benchmark or comparison against which to measure ongoing GRC efforts in an organization or a comparison to similar organizations in the same sub-class of trade or geography or cyber risk management practice. Risk officers shall soon be able to proactively manage business operations and compliance in a single uniform platform regardless of business vertical or complexity. For the first time, the cybersafety methodology shall enable companies to evaluate their potential exposure of the various cyber-risks and develop proactive measures to minimize that risk. Moreover, the CS methodology is compatible with the rapidly expanding software-defined IT service class of business.

The platform enables the building of custom IT service recipes for multi-orchestration, providing a multi-client management interface for enterprise IT teams. The platform can identify incremental IT event's value@risk exposure, prior, during and following. These IT events can be proactively risk scored and underwritten enabling real-time nano-insurance, blockchain-based C3C smart contracts.

C3C Token Platform

The C3C token is a multi-tier blockchain platform that encompass three cyber risk functions: 1) cyber risk event identification token; 2) cyber risk control blockchain; and 3) cyber risk transfer blockchain.

The C3C will enable the securitization of the underlying 'value of risk' of the CTP. C3C tokens may be able to provide an array of financial rights to the user/holder, such as equity, dividends, profit share rights, voting rights, and buy-back rights pegged to the ecosystem's value. The C3C token represents a right to the asset value attributed to the company overseeing the ecosystem, such as profits, cash flow, reinsurance holdings and investment capital returns. Rights may be written into the C3C smart contracts and C3C tokens will be allowed to be traded on SEC compliant exchanges as financial securities.

Following the completion of the STO and satisfaction of "know-your-customer" protocols, the C3C security token generation will follow. The securitized token will be available for use on the CTP. The C3C token framework has monetary value within the CTP network, as a tradable security asset on future ATS/exchanges. The value, however, may be converted into fiat currency via an approved C3C wallet.

Additionally, C3C value can be used to pay for other risk transfer services offered within the ecosystem, including risk services with participating telos, cloud service networks and insurance services worldwide. Once again, the C3C securities value may be pegged to the company's overall profit, and revenues directly earned for engagement on network. Although the price of C3C's may increase with time, such an increase is not guaranteed and should not be reason enough to acquire C3Cs.

Finally, the invention introduces a more efficient transaction insurance derivative of the greatly anticipated C3C protocol, before any B3i insurance blockchain. C3C will be unique in the fact that it is based on proof of PORT i.e., proof of premium, as opposed to proof of stake and/or proof of work. C3C PORT has the primary benefit of dramatically reducing the amount of risk over time and energy required to operate super-efficient, lightning fast blockchain transactions, reducing both fixed and variable costs, as well as ensuring that the blockchain remains scalable and sustainable.

C3C Token Acquisition

C3C tokens can be acquired by purchase, earning, trading, and participating in CTP programs. Individuals will have an option to purchase C3C tokens via one or more of the following:

Trading on the cryptocurrency exchange;
Trading on a crypto-settlement exchange;
Directly from holders of C3C tokens;
Directly from the company via the C3C wallet;
During pre-sale STO events Furthermore, C3C tokens can be earned by active service members participation utilizing CTP. Simply through engagement on CTP, service (node) can be converted to C3C utility tokens using the cryptocurrency wallet. The membership (value) can be earned within the ecosystem as well as through partnering networks. This process will expand the C3C token usability, providing limitless economic possibilities for all parties involved. C3C tokens may also be acquired through peer-to-peer auctions. Lastly, users can obtain C3C tokens by participating in loyalty programs offered by insurance carriers. The collected tokens can be exchanged for goods and services with participating insurance partners and additional technology products, including cloud exchange services and SDN consultants.

C3C Token Use

After C3C token generation event, individuals and businesses alike can use C3C tokens to do one or more of the following:

Pay for risk transfer services;
Pay for insurance partner membership;
Pay for technology partner membership;
Pay for sponsored membership and other risk marketing products offered by the C3C token platform.
Exchange tokens for cryptocurrencies e.g. Bitcoin, using a crypto-exchange;
Use C3C token to pay for insurance products-services via partner platform network;
Exchange tokens for goods and services using the C3C token platform;
Transfer C3C tokens between users (peer-to-peer) B2B, B2C, and C2C.

C3C Token Risk

Individuals and businesses should observe and respect the risks according to one or more of the following:

C3C token is not currency, issued by any national, supranational or central bank;
There are multiple factors that may directly or indirectly influence the value of C3C that may not be within control of the C3C token platform and/or the associated company;
C3C token is not in any way backed by any hard assets or other credit;
Trading C3C tokens will depend on consensus of value@risk among market participants;
At any given time, there may be no available market for C3C, nor buy and sell C3C;
No one is obligated to purchase any C3C from any holder of C3C.

C3C Risk Transfer Platform

The CRT is the specific risk transfer tracking mechanism that allows C3C users to conduct financial risk operations with the C3C's cyber "risk-transfer" token. The CRT is the community of all risk transfer entities, participants, technical services, node connectivity and the decentralized nature of the C3C protocol that are connected by common economic interest that specifically include data's risk.

The invention solves the financial setbacks of tracking a risk IT event on an incremental basis faced by the [cyber] insurance industry. The CRT platform may function as an autonomous cross-chain/side-chain, and may be established as a risk-monetary exchange, set to run as a self-regulating decentralized blockchain. The CRT may exist autonomously regulated by the CRT blockchain participants. The CRT may incorporate a digital escrow wallet and be accessible per membership. In addition, C3C tokens may be converted into fiat-based currency via online digital exchange or an ATS.

The CRT platform will have the following features: secure sale, C3C token withdrawal, debit/credit claims and arbitration mechanisms. The CRT platform may operate as a permissioned blockchain and thereby be regulated by all participants of the C3C blockchain. The CRT platform will not generate profit by itself, as it will be fee-less to operate. However, the underlying C3C will possess securitized value due to its risk transfer value purpose.

The CRT may serve as a marketplace for multiple other insurance-related product-lines as well, which may be offered according to the entity's data risk standard protocol that may be interoperable amongst multiple service features. Such integration will allow mainstream users to use C3C tokens at any insurance service in the near future. Subscribers will be able to use C3C tokens as a transaction medium to purchase additional insurance products and pay for cloud services including telco services benefiting from enhanced security and arbitration mechanisms.

C3C Risk Transfer

To protect C3C risk transfer, "Buyer" (the "Risk Purchaser" or "Customer") and "Seller" (the "Risk Acceptance" or "Insurance Entity") engaged in online transactions involving a C3C token. The CRT is programed with the CSC that include escrow, risk asset valuation, arbitration, adjudication and appeal services for each policy in CRT. The CRT platform will aim to reduce fraud while stimulating the C3C Insurance blockchain to build trustworthiness.

The C3C network escrow service is designed to benefit the customer, ensuring fulfillment of promises outlined by the CSC insurer. The funds payable by the customer upon purchasing of a risk asset which may be held by the C3C system in escrow until the risk transfer is successfully performed by forensic ledgering each transaction in real-time then reconciling the customer's entire data history at the end of each month—i.e., updating the C3C blockchain periodically, not with every transaction.

The system may use sophisticated tracking and client feedback mechanisms to confirm validation of risk transfer service within allocated PORT validation. Once the customer auto-confirms receipt of data, the C3C's risk transfer funds (proof of premium) is released by the system, and transferred to the entity's C3C insurance account.

The arbitration service is designed to establish insurance entity's trustworthiness and govern product quality that promotes fairness in the marketplace. In case the insurance entity fails to perform the risk transfer service within the set PORT timeframe, or the risk transfer service does not meet the description (i.e., poor quality, defective, inter-corrupted, etc.), the customer can open a dispute and auto-request a refund. The arbitration mechanism will engage participants of the blockchain via voting. A party at fault will be subjected to a penalty. The C3C tokens seized as a penalty will be withdrawn from circulation and "purge by deletion".

The appeal process is designed to benefit the insurance entity, protecting from wrongful accusations and illegitimate claims brought forth by customers. The insurance entity can appeal, by submitting an (immutable) explanation and presenting digital-forensic evidence to the participants of the blockchain. If accused party is found not liable, the remaining party may be penalized.

The secure risk transfer feature may be a pay-for-use service. The rendering party may be responsible for paying a service fee in C3C tokens. The fee amount is determined by a vote by blockchain participants. C3C tokens collected as a payment for risk transfer may be removed from the blockchain via deletion.

Secure C3C Risk Transfer Algorithm

Listed are the algorithmic steps and risk attributes used to populate a C3C smart contract:
  Outline Smart Contract and policy terms of the "master" transaction, including risk transfer service timeframe and policy limits.
  All information may be registered in the blockchain through a distinctive hash generator.
  Using cryptocurrency wallet, a customer can review the product together with all financial and delivery terms and conditions.
  In case the customer decides to purchase the risk product/service, he/she must follow the transaction conditions outlined by the insurance entity.
  The funds payable to insurance entity may be held in escrow by system until the confirmation of risk transfer service is received from customer.
  In case the insurance entity failing to fulfill its risk transfer obligations, this may include poor quality of service and/or policy defects, risk limits, claim adjudication issues, etc., the customer can open a dispute, and (claim) request a refund.
  Once the policy dispute is opened, all participants of blockchain receive notification to join the arbitration process via smart-voting mechanism.
  Taking into account the amount of a refund, nature of the risk transfer service, and policy conditions, the automated arbitrage system may auto-calculate the timeframe and a number of blockchain participants to be involved as a jury to resolve a dispute.
  The platform may inform parties including blockchain participants about the number of time-cycles allocated for voting, and minimum votes needed to settle the dispute.
  Once the minimum number of votes has been reached within allocated timeframe, disputes may be settled to benefit customers.
  In case not enough votes are received, the disputed ticket may be closed.
  The party that does not prevail may be subjected to a penalty. The penalty may be calculated as a percentage of the amount being disputed.
  The C3C tokens collected as a penalty may be withdrawn from circulation, purged.
  Either party can appeal. An appeal fee may be charged to start the process. The appeal process may engage blockchain participants using voting mechanism.
  In case the appeal is lost by the appealing party, the collected appeal fee may be withdrawn from circulation and purged. The losing party pays penalty and costs of appeal.

Overall, the secure risk transfer feature is designed to benefit the customer and forces the insurance entity to fulfill their obligations. This system directly promotes better product quality, speedy cyber risk service, and the decentralized arbitration system may provide transparency to all disputes. In the long run, incorporating secure risk transfer feature in all financial insurance transactions will benefit the insurance entity by promoting honest business practices establishing trustworthiness and a good reputation.

The secure risk transfer service may function based on a more complex algorithm, making it fast, transparent and user-friendly. It is predicted that participants of cyber data insurance ecosystem will employ this service for all day-to-day online operations, as it will deliver a cyber-safety net for all B2C and B2B transactions. Further, it is predicted that the arbitration and appeal mechanisms may not be engaged often because participants in the data insurance system:
  will strive to conduct their business honestly, avoiding illegitimate transactions;
  work to build brand and trustworthiness in the cyber data risk marketplace;
  aspire to irradiate negative stigmas plaguing the cybersecurity industry;
  aim to comply with regulators and promote the regulation of cyber data insurance.

The C3C platform will enable the minimization of insurance fraud incidence and illicit activity in the digital marketplace, help to resolve disputes fairly with the use of blockchain and promote honest business practices and build strong B2B/B2C relationships. It is predicted that C3C features will stimulate cyber-related businesses to adopt the C3C as the main insurance transaction medium for all insurance operations.

CCL may utilize the utility-based CRT for its back-office operations at enterprise scale. Blockchain is not backed by any hard assets and no profit may be allocated to token holders by the Company. The C3C token is intended to be used within the CloudLedger platform and within further developed C3C platforms. C3C token holders may generate profit, because of their own entrepreneurial efforts on the secure risk transfer platform. C3Cs may run on decentralized "side-chain-based" blockchain, ensuring transparency and security of all financial transactions.

C3C CloudLedger Framework Components: The C3C CloudLedger blockchain framework is used to build enterprise blockchains for a consortium of software-defined, risk based solutions that are to roll-out over the following two years, which include CS identity, CS certification, CS compliance and data insurance. The C3C CloudLedger is different from public ledgers such as Ethereum. The C3C CloudLedger specifically in-sync accounts for the main-net "side-chain" transactions.

The CloudLedger components operate collectively with certain aspects of stability properties:
Promise to offer service accuracy and stability based on PORT
Promise to offer a service with a certain audit-based POS
Promise to offer a certain service at a stated risk premium (pricing risk stability)
Promise to encompass certain liability for risk transfer service fee (risk transfer guarantee)

The C3C CloudLedger framework includes:
A decentralized "append only" distributed ledger;
A consensus algorithm for agreement to change requests in the ledger;
Privacy of transactions through 'permissioned' access only;
Unique risk transfer properties that translate across multiple insurance services;
Smart contracts to process "auto-enabled" transaction requests.

Upon completion of the STO generating C3C tokens, users will be able to:
trade acquired C3C security tokens or convert into Ethereum, bitcoin and fiat currency via an ATS exchange;
convert acquired C3C value into C3C utility risk tokens, or hold as a security investment;
use C3C tokens to transfer or trade risk services within the ecosystem who require cyber risk insurance, or wish to purchase risk products offered by insurance partners;
use C3C tokens to pay for risk membership services;
use C3C tokens to pay for risk services offered by partners and risk products;
use C3C token as a method of payment for premiums and services with participating broker/carriers of the cyber-safety partner services.

Computer networks have come to be used for many aspects in business and personal life because computer networks enable large amounts of data to be accessed for a variety of purposes. There are increasing numbers of reported incidents concerning unauthorized access to information stored on computer networks. A variety of techniques have been developed in an effort to prevent the unauthorized access to information stored on computer networks.

In response, the persons attempting to obtain unauthorized access to information stored on computer networks have become increasingly more sophisticated in their efforts to circumvent the enhanced security methods. Most instances or attempts to obtain unauthorized access to a computer network come from outside of the company, because persons who have access to the computer network from inside of the company typically have undergone review prior to being provided with access to the computer network.

One technique to rate the potential risk of unauthorized access to the computer network is to selectively identify the cybersafety or cyber risk of a connection between the computer network and other computers, such as the internet, when it is desired to transmit and/or receive data. Using such a process significantly provides risk awareness because persons attempting to gain access to the computer network can determine not only when the connection is at risk near real time, but also verify the safety needed to access the network during a limited amount of time the connection is active.

With computer networks that are always connected to the internet, it is possible for unauthorized third-parties to periodically check the status of the connection to ensure that the connection is functioning prior to an unauthorized attempt to transmit data between the networks. The invention will apply blockchain-based resources to identify and account the IT event's network connection and determine permission-based access due to a smart-contract's protocol rules and policies that allow data at risk to move and transact. Risk transfer is embedded inline and real-time timestamped concerning the data's egress, thus enabling PORT.

The invention will enable offering the next generation of underwriting products, whereby our data lake shall enable insurance companies the ability to underwrite an enterprise's compliance risk for the first time-including data breach notification, property/liability insurance, blockchain insurance and the use of a customer's CS cyber-risk score history to set premium insurance limits. These unique, one-of-a-kind products will be the first risk-transfers products available in any market that exceed regulatory mandates.

Figure 2:
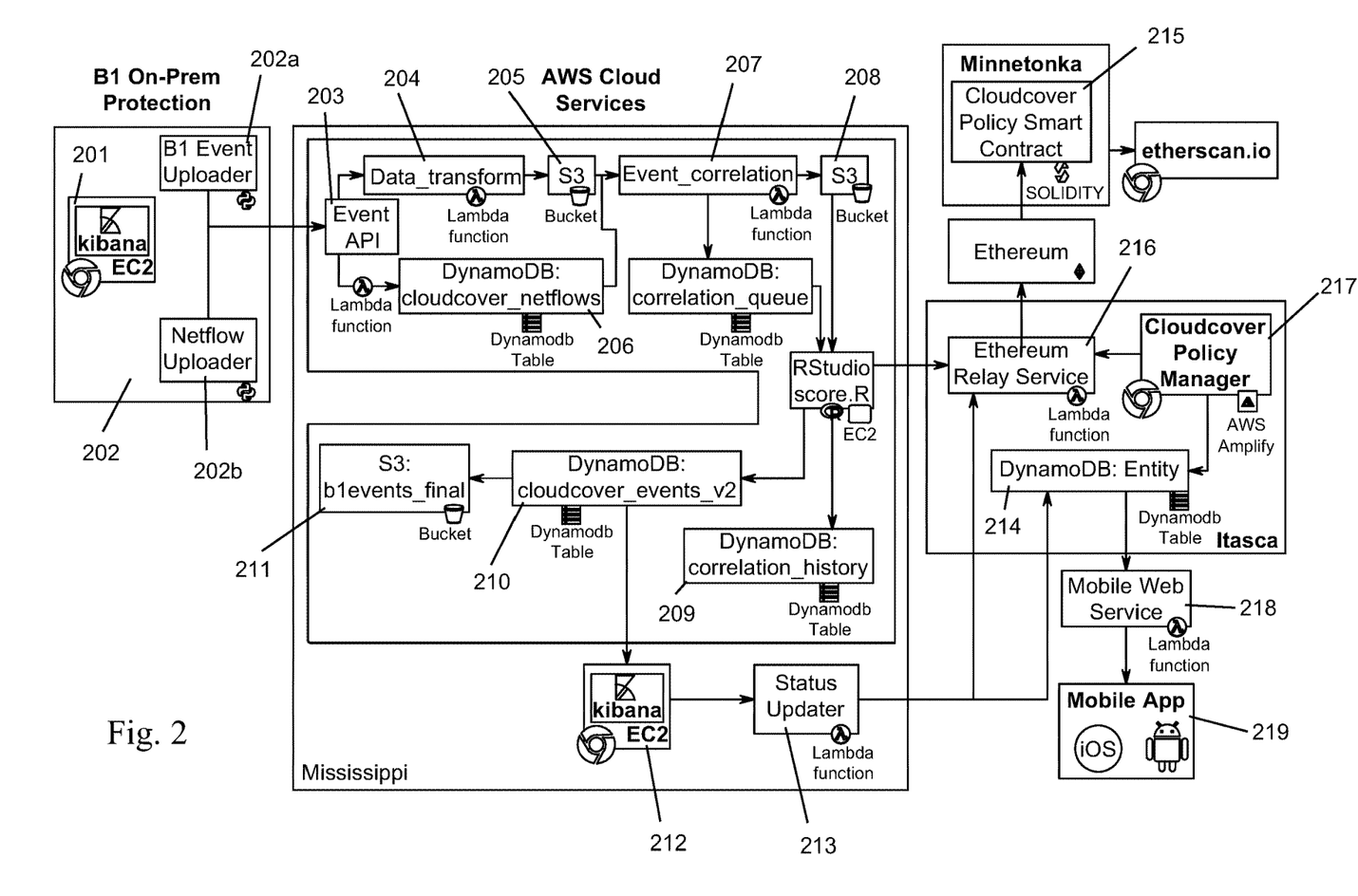
FIG. 2 is another embodiment of the invention.

Another embodiment of the invention is set forth in FIG. 2. 201 is an on-premise dashboard that collects information relating to IT events on the customer site. The dashboard may show a variety of details such as geographic and real-time event priorities and risk scores.

202 is an on-premise event uploader. In certain embodiments, the on-premise event uploader includes 202a an event uploader for events, reading local real-time events. Data relating to these events may be packaged and sent to the CloudCover Cloud API. The on-premise event uploader may also include 202b an event uploader for network events, reading local netflow events. Data relating to these events may be packaged and sent to the CloudCover Cloud API.

The next section, which is identified as Mississippi, may be utilized on an off-site data processing facility such as AWS Cloud Services. The section includes an event receiver 203 that hosts API services to receive data from all of the event uploaders relating that is sent from the on-premise devices 202a, 202b.

The events are extracted and restructured to be in time series clustered structure such as using a data transform process 204. The processed data is then stored such as in time structured S3 storage 205. Data from the Event API 203 is also processed to extract and restructure netflow events 206, which also may be stored in the S3 storage 205.

Next a computational complex time-aligning time-window based matching algorithm correlates 207 the event and the netflow events in a selected time period such as in 1 minute intervals. This process enriches the events with "in-bytes" and "out-bytes" for each event.

The enriched events are stored such as using S3 storage 208 prior to the next processing step. At 209, a history of computation of events is stored such as in a DynamoDB, which enables continuous process. Finalized enriched events along with priorities, risk scores, risk rates are permanently stored in a database 210 such as DynamoDB. In certain embodiments, this data is stored for a period of time such as 3 days. Finalized enriched events are stored such as in S3 storage 211.

Finalized enriched events are also sent to a dashboard 212 such as Kibana, which enables visualization of scores and rates. Status updater 213 periodically sends statistics from dashboard data to DynamoDB.

In the next section 214, which is identified as Itasca, periodically retrieves event info. This data is consolidated and sent to a relay service such as Ethereum Relay Service to thereby sync to the Ethereum blockchain.

In the next section 215, which is identified as Minnetonka, CloudCover smart contract receives events info, logs them as smart contract event logs, update policy status according to the scores and escrow states.

A captive office webapp (CloudCover Policy Manager) writes policy information securely into Ethereum Relay Service 216. This relay service synchronizes the information to the Ethereum blockchain.

A captive office webapp (CloudCover Policy Manager) is hosted in AWS Cloud Services 217 that enables public access to create customer policies, monitor risk policies and manage policies for and with customers interaction, integration and approval.

The CloudCover mobile API services are hosted such as in AWS Cloud Services, serving mobile application functionality. The CloudCover mobile application, which include iOS and Android operating systems, interacts with Cloud-Cover mobile API to aggregate all information from Cloud-Cover including but not limited to (1) customer master policies, C3C blockchain events, real-time risk scores, risk rates, priority(s) and events(s) summary and alerts, notifications, etc.

Figure 3:
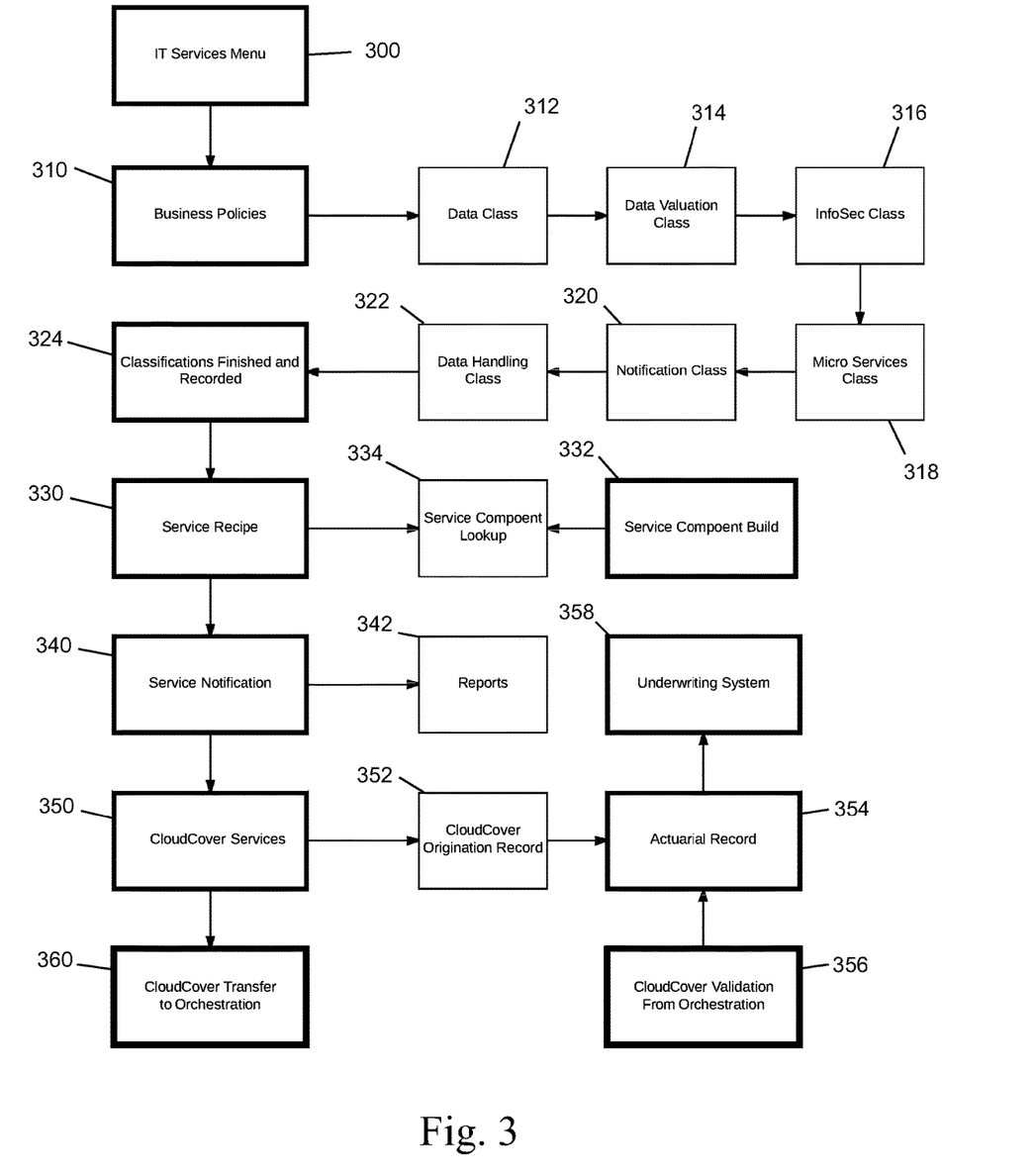
FIG. 3 is another embodiment of the invention.

Another embodiment of the invention is directed to a cybersafety origination tool, which is illustrated in FIG. 3. The invention may be utilized in conjunction with a variety of mechanisms and configurations. In one such configuration, this embodiment of the invention is utilized in conjunction with virtual network.

As an initial aspect in using the cybersafety origination tool, an IT services menu 300 is provided. As used herein, IT means information technology. The IT services menu 300 may include a variety of options for a user to select. One of those options may include business policies 310. After the business policies is selected, the user selects the data class 312 that is to be protected. Based upon the data class 312 that is selected, the user is presented with a data valuation class 314 to select. The user then selects InfoSec class 316 and micro services class 318. Next, a notification class 320 and a data handling class 322 is selected.

The selected classifications are finished and recorded 324. In certain embodiments, this recordation may be recorded in a blockchain. Utilizing the blockchain to record the classifications thereby protects this data.

Based upon the recorded classifications, a service recipe 330 is prepared. This service recipe 330 and a service component build 332 are used to prepare a service component lookup 334.

The service recipe 330 then generates a service notification 340 that may be sent to the user. This service notification 340 may also be stored in a reports database 342. In one such embodiment, the reports database 342 utilizes a blockchain in case there is a question as to the aspects of the service recipe 330 or whether the service notification 340 as sent.

The service notification 340 also engages CloudCover services 350 to initiate the process of providing cybersafety services to the user. Once the notification is received, the CloudCover services 350 records a CloudCover origination record 352, which is then transferred to an actuarial record 354. The actuarial record 354 also receives input from CloudCover validation from orchestration 356. The actuarial record 354 is then sent to an underwriting system 358. The CloudCover services 350 is also sent to the CloudCover transfer to orchestration module 360.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An IT event display system comprising:
   an on-premise event uploader that is capable of reading local events in real-time and netflow events;
   an off-site data processing facility that receives data from the on-premise event uploader;
   a processing module to extract and restructure the data into a time series clustered structure;
   a correlation module using a computational complex time-aligning time-window based matching algorithm to correlate the local events and the netflow events by associating "in-bytes" and "out-bytes" with each event to prepare enriched event data; and
   a display module that is capable of displaying the enriched event data.

2. The IT event display system of claim 1, and further comprising a storage module that is capable of storing the enriched event data.

3. The IT event display system of claim 1, and further comprising a transfer module that is capable of storing the enriched event data into a blockchain.

4. The IT event display system of claim 1, and further comprising a smart contract generation module that is capable of generating a smart contract based upon the enriched event data.

5. The IT event display system of claim 4, wherein the smart contract is an insurance policy and wherein the IT event display system further comprises a transfer module that is capable of syncing the insurance policy into a blockchain.

6. A method of displaying IT events comprising:
   reading local events and netflow events using an on-premise event uploader;
   transferring data relating to the local events and the netflow events from the on-premise event uploader to an off-site data processing facility;
   extracting and restructuring the data into a time series clustered structure;
   correlating the time series clustered structure data of the local events and the netflow events by associating "in-bytes" and "out-bytes" with each event to prepare enriched event data; and
   displaying the enriched event data.

7. The method of claim 6, and further comprising storing the enriched event data.

8. The method of claim 6, and further comprising storing the enriched event data into a blockchain.

9. The method of claim 6, and further comprising generating a smart contract based upon the enriched event data.

10. The method of claim 9, wherein the smart contract is an insurance policy and wherein the method further comprises syncing the insurance policy into a blockchain.

11. A method of generating an insurance policy comprising:
- reading local events and netflow events using an on-premise event uploader;
- transferring data relating to the local events and the netflow events from the on-premise event uploader to an off-site data processing facility;
- extracting and restructuring the data into a time series clustered structure;
- correlating the time series clustered structure data of the local events and the netflow events by associating "in-bytes" and "out-bytes" with each event to prepare enriched event data;
- generating a smart contract based upon the enriched event data, wherein the smart contract is an insurance policy.

12. The method of claim 6, and further comprising storing the enriched event data.

13. The method of claim 6, and further comprising storing the enriched event data into a blockchain.

14. The method of claim 9, and further comprising syncing the insurance policy into a blockchain.

* * * * *